(12) United States Patent
Beaumont

(10) Patent No.: US 12,691,609 B2
(45) Date of Patent: Jul. 28, 2026

(54) HEATING APPARATUS AND ANTI-IGNITION RE-USEABLE BLADDER

(71) Applicant: Darcy Leigh Beaumont, Stony Plain (CA)

(72) Inventor: Darcy Leigh Beaumont, Stony Plain (CA)

(73) Assignee: Darcy Beaumont (CA)

( * ) Notice: Subject to any disclaimer, the term of this patent is extended or adjusted under 35 U.S.C. 154(b) by 1327 days.

(21) Appl. No.: 17/472,655

(22) Filed: Sep. 12, 2021

(65) Prior Publication Data

US 2022/0080621 A1 Mar. 17, 2022

(30) Foreign Application Priority Data

Sep. 15, 2020 (CA) ................................ CA 3093154

(51) Int. Cl.
B29B 17/02 (2006.01)

(52) U.S. Cl.
CPC ...... B29B 17/02 (2013.01); *B29B 2017/0217* (2013.01); *B29B 2017/0268* (2013.01)

(58) Field of Classification Search
CPC ............ B29B 17/02; B29B 2107/0217; B02B 2017/0268; B23K 23/0276; B23K 2101/10

USPC ................................................ 431/13; 266/56
See application file for complete search history.

(56) References Cited

U.S. PATENT DOCUMENTS 5,685,996 A * 11/1997 Ricci ................. B23K 37/0536
219/60 A

OTHER PUBLICATIONS

SSEGPL (YouTube. (May 20, 2020). Pipe Pre-Heating Torch | External Pre-Heating Torch | OD Mounted Torch| Pipeline heating and coating. YouTube. https://www.youtube.com/watch?app=desktop &v=OJsbl_AHmKO (Year: 2020).*
Sava (https://www.amazon.com/Sava-Multi-Size-Inflatable-Pipe-Plug/dp/B01180TDVM, Date first available July, 8 2015 (Year: 2015).*

* cited by examiner

*Primary Examiner* — Vivek K Shirsat

(57) ABSTRACT

The invention concerns a heating apparatus for recycling metal work pieces such as pipes, stacks, tanks and chutes which are lined and/or coated with materials such as rubber, neoprene, polyurethane or plastic. The heating apparatus applies heat to metal work piece to the point where the adhesive bond between the metal work piece and the rubber, neoprene, polyurethane or plastic is broken. An anti-ignition re-usable bladder is fitted inside a metal work piece to prevent ignition of the liner and/or coating and eliminate or significantly reduce the release of gases from the liner and/or coating during the heating process.

11 Claims, 7 Drawing Sheets

Front View

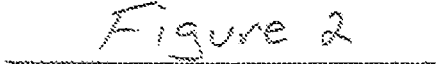
Figure 2
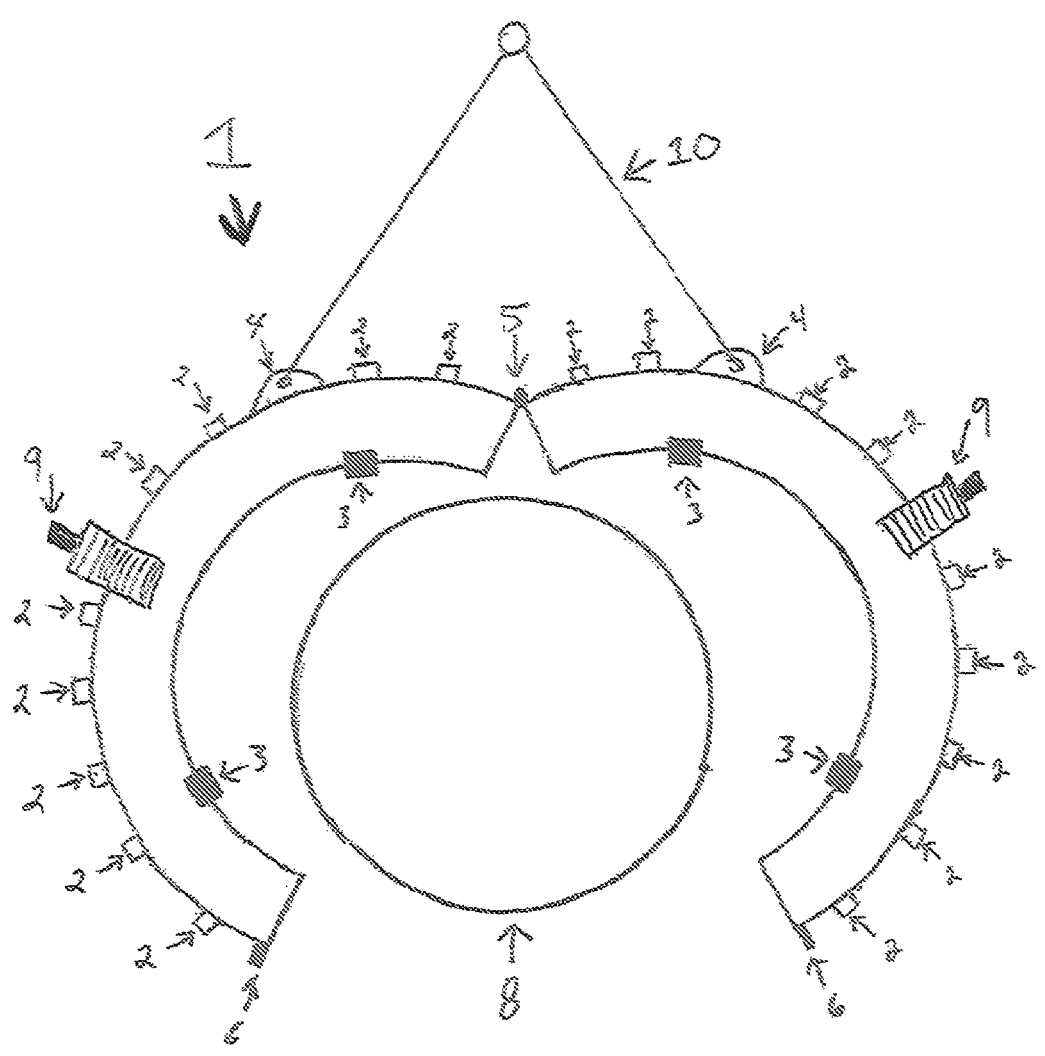

HEATING APPARATUS AND ANTI-IGNITION RE-USEABLE BLADDER

FIELD OF THE INVENTION

The invention concerns a heating apparatus for recycling metal work pieces such as pipes, vessels, tanks, chutes and stacks which are lined with materials such as rubber, neoprene, polyurethane or plastic. An anti-ignition re-usable bladder is fitted inside of the metal work piece to prevent ignition of the liner and/or coating and eliminate or significantly reduce the release of gases from the liner and/or coating during the heating process.

BACKGROUND OF THE INVENTION

Rubber, neoprene, polyurethane, plastic and epoxy are growing in popularity as cost effective liners and coatings that have excellent erosion, abrasion and corrosion resistance. You will find these products inside piping systems, shaker boxes, chutes, tanks and vessels. Rubbers, neoprene's, polyurethanes, plastics and epoxy's come in a variety of different formula's that provide a wide range of characteristics to meet a wide range of applications.

SUMMARY OF THE INVENTION

A heating apparatus for recycling metal work pieces such as pipes, stacks, tanks and chutes which are lined or coated with materials such as rubber, neoprene, polyurethane plastic or any non-metallic material on the inner surface(s). The heating apparatus surrounds the metal work piece and a space exists between the inside diameter of the heating apparatus and the outside diameter of the metal work piece exists so as to clear the metal work piece and any obstacles on the metal work piece. The heating apparatus moves over the metal work piece and heats the metal work piece to the point where the adhesive bond between the metal work piece and the rubber, neoprene, polyurethane, plastic or non-metallic material is broken. The heating apparatus supplies a controlled, uniform and adjustable heat source to the outside surface of the metal work piece.

The heating apparatus consists of gas burners spaced apart and connected to one another forming a minimum of two halves which are connected with a hinge. The two halves of the heating apparatus are fitted with a lifting lug and a connector allowing the heating apparatus to be opened for easy installation around a metal work piece and then closed around the metal work piece with connector engaged. The heating apparatus includes a minimum of one roller to support and position the heating apparatus.

The heating apparatus is self-propelled, pulled or pushed across the metal work piece at a speed which is variable and partially or fully automated. The heating apparatus can be fitted with a minimum of one optional counter weight to discourage clock wise or counter-clock wise movement of the heating apparatus. The heating apparatus can be fitted with optional sensors such as temperature, speed, movement and emergency gas shut off systems.

An anti-ignition re-usable bladder is installed on the inside of metal work pieces such as pipes, stacks, tanks, vessels and chutes which are lined or coated with materials such as rubber, neoprene, polyurethane, plastic or any non-metallic material for the purpose of recycling the metal work piece. A minimum of one anti-ignition re-usable bladder is fitted inside a metal workpiece which is lined or coated on the inner surface. The anti-ignition re-usable bladder includes a minimum of one fitting for the purpose of inflating and deflating the anti-ignition re-usable bladder. The anti-ignition re-useable bladder is inflated inside the metal work piece and ultimately takes on the inner shape of the metal work piece and the outside surface of the anti-ignition re-useable bladder is firmly pressed against the surface of the liner or coating. The anti-ignition re-usable bladder is flexible, heat resistant, fire resistant, non-absorbent and capable of expanding and taking on the shape of the internal metal work piece and capable of holding and maintaining a pressurized gas and being any length, dimension or shape. The anti-ignition re-useable bladder prevents ignition of the liner and/or coating and eliminates or significantly reduces the release of gases and smoke from the liner and/or coating when exposed to heat.

An anti-ignition re-useable bladder for recycling metal work pieces such as pipes, stacks, tanks and chutes which are lined or coated with materials such as rubber, neoprene, polyurethane, plastic or any non-metallic material for the purpose of recycling the metal work piece. A minimum of one anti-ignition re-useable bladder is fitted inside a metal workpiece which is lined or coated on the inside surface. The anti-ignition re-useable bladder includes a minimum of one fitting for the purpose of inflating and deflating the anti-ignition re-useable bladder. The anti-ignition re-useable bladder is inflated and ultimately takes on the shape inside the metal work piece, said anti-ignition re-useable bladder having one side, top or bottom being significantly flat. The outside surface of the bladder is firmly pressed against the surface of the liner or coating. The anti-ignition re-useable bladder is flexible, heat resistant, fire resistant, non-absorbent and capable of expanding and taking on the shape of the internal metal work piece and capable of holding and maintaining a pressurized gas and being any length, dimension or shape. The anti-ignition re-useable bladder prevents ignition of the liner and/or coating and eliminates or significantly reduces the release of gases and smoke from the liner and/or coating when exposed to ambient heat. The anti-ignition re-useable bladder has one side, top or bottom being significantly flat. This significantly flat side, top or bottom includes a minimum of one fitting for the purpose of inflating and deflating the anti-ignition re-useable bladder.

SUMMARY OF THE DRAWINGS

FIG. 2 shows a front view of the heating apparatus with the connector disengaged and being suspended by the two lifting lugs and a sling. The lugs are positioned so that the heating apparatus spreads open for easy installation over the pipe. The disengaged connector and the hinge allow the heating apparatus to spread open when lifted by the lifting lugs for ease of installation and removal. Two winching devices are fitted to the heating apparatus. Four rollers are fitted to the heating apparatus.

DETAILED DESCRIPTION OF THE DRAWINGS

Figure 1:
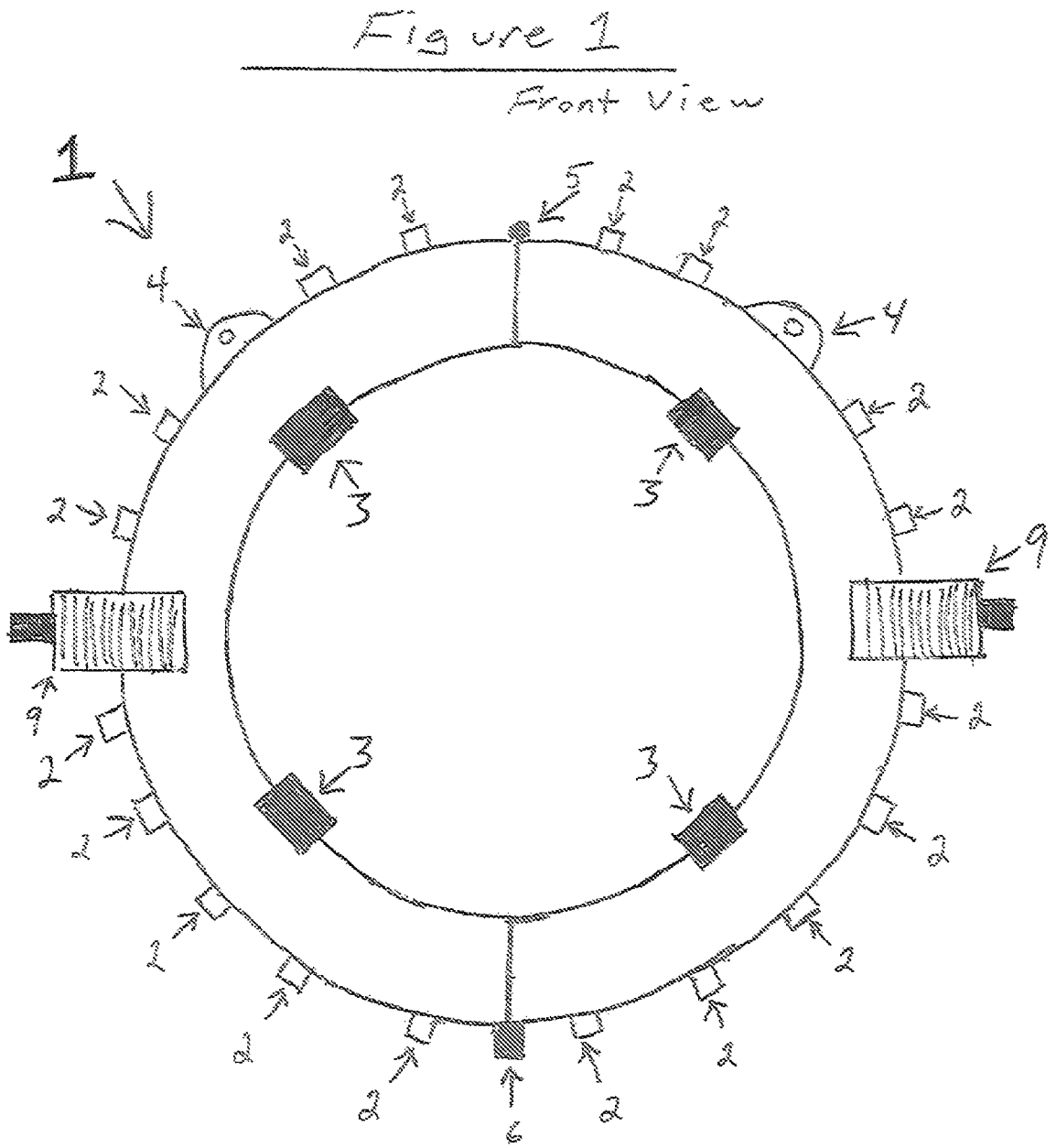
FIG. 1 shows a front view of the heating apparatus which consists of two halves which are connected together with a hinge and a connector. The heating apparatus is fitted with two lifting lugs, multiple gas burners, four rollers and/or wheels and two winching devices. The rollers position and support the heating apparatus on the metal work piece.

FIG. 1 shows a front view of the heating apparatus 1 which consists of two halves which are connected together with a hinge 5 and a connector 6. The heating apparatus 1 is fitted with two lifting lugs 4, multiple gas burners 2, four rollers and/or wheels 3 and two winching devices 9. The rollers and/or wheels 3 position and support the heating apparatus on the metal work piece.

FIG. 2 shows a front view of the heating apparatus 1 with the connector 6 disengaged and being suspended by the two lifting lugs 4 and a sling 11. The lugs 4 are positioned so that the heating apparatus 1 spreads open for easy installation over the pipe 8. The disengaged connector 6 and the hinge 5 allow the heating apparatus 1 to spread open when lifted by the lifting lugs 4 for ease of installation and removal. Two winching devices 9 are fitted to the heating apparatus 1. Four rollers and/or wheels 3 are fitted to the heating apparatus.

Figure 3:
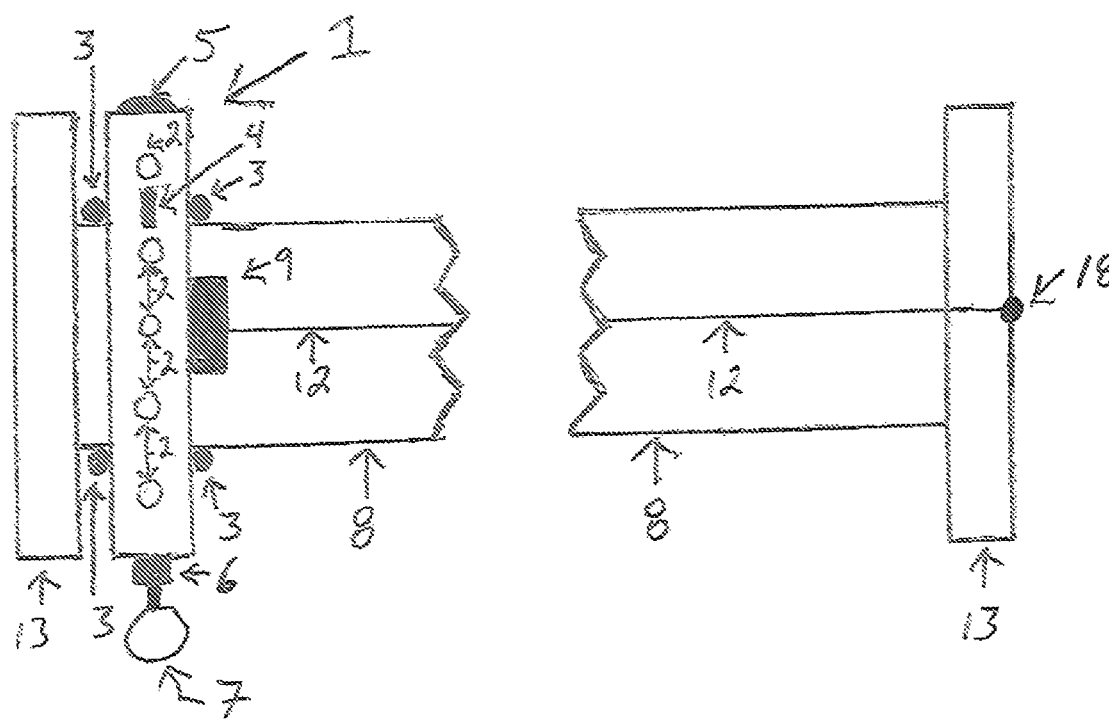
FIG. 3 shows a side view of the heating apparatus which has been installed over a pipe with flanges on each end. A winching device is fitted to the heating apparatus and its cable is extended from the winching device to an anchoring point on the other end of the pipe or flange. The cable from the winching device is attached to the anchoring point so that the winching device can pull the heating apparatus over the pipe when the winch is engaged. The speed of movement is variable. Rollers and/or wheels position and support the heating apparatus so that an equal or near equal space exists between the inside diameter of the heating apparatus and the outside diameter of the pipe. The rollers and/or wheels allow the heating apparatus to smoothly move over the pipe. Rollers and/or wheels are fitted to both sides of the heating apparatus. An optional counter weight is fitted to the bottom of the heating apparatus so as to keep the heating apparatus positioned correctly and discourage the heating apparatus from rotating clock wise or counter clock wise on the pipe.

FIG. 3 shows a side view of the heating apparatus 1 which has been installed over a pipe 8 with flanges 13 on each end. A winching device 9 is fitted to the heating apparatus 9 and its cable 12 is extended from the winching device 9 to an anchoring point on the other end of the pipe 8 or flange 13. The cable 12 from the winching device 9 is attached to the anchoring point 18 so that the winching device 9 can pull the heating apparatus 9 over the pipe when the winch is engaged. The speed of movement is variable. Rollers and/or wheels 3 position and support the heating apparatus 1 so that an equal or near equal space exists between the inside diameter of the heating apparatus and the outside diameter of the pipe. The rollers and/or wheels 3 allow the heating apparatus to smoothly move over the pipe 8. Rollers and/or wheels 3 are fitted to both sides of the heating apparatus 1. An optional counter weight 7 is fitted to the bottom of the heating apparatus 1 so as to keep the heating apparatus 1 positioned correctly and discourage the heating apparatus from rotating clock wise or counter clock wise on the pipe.

Figure 4:
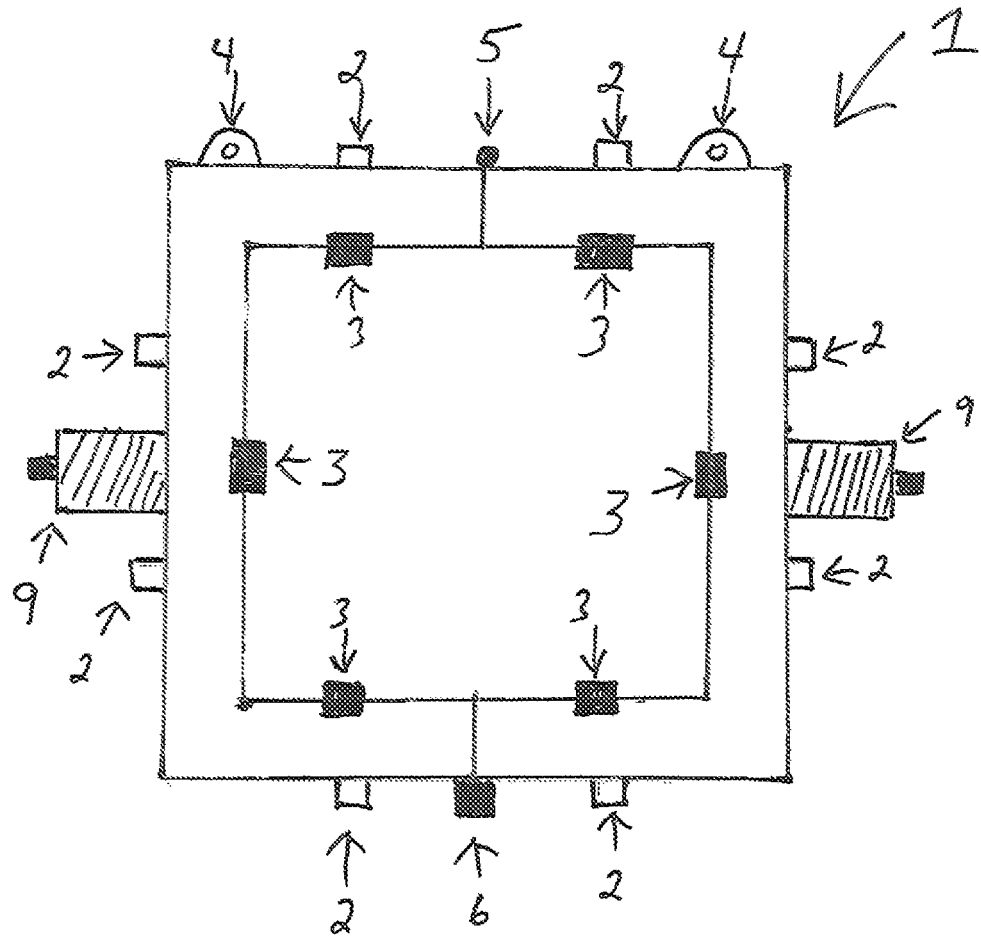
FIG. 4 shows a front view of the heating apparatus consisting of two halves connected together by a hinge. The connector opposite of the hinge locks the two halves together. Several burners are spaced apart on the heating apparatus. Two winches are installed on the heating apparatus to pull it over a metal work piece. A lifting lug is fitted to each half of the heating apparatus for the purpose of installing the heating apparatus over the metal work piece to be heated. Rollers and/or wheels position and support the heating apparatus so that an equal or near equal space exists between the inside diameter of the heating apparatus and the outside diameter of the metal work piece.

FIG. 4 shows a front view of the heating apparatus 1 consisting of two halves connected together by a hinge 5. The connector 6 opposite of the hinge locks the two halves together. Several burners 2 are spaced apart on the heating apparatus 1. Two winches 9 are installed on the heating apparatus 9 to pull it over a metal work piece. A lifting lug 4 is fitted to each half of the heating apparatus 1 for the purpose of installing the heating apparatus 1 over the metal work piece to be heated. Rollers and/or wheels 3 position and support the heating apparatus so that an equal or near equal space exists between the inside dimensions of the heating apparatus and the metal work piece.

Figure 5:
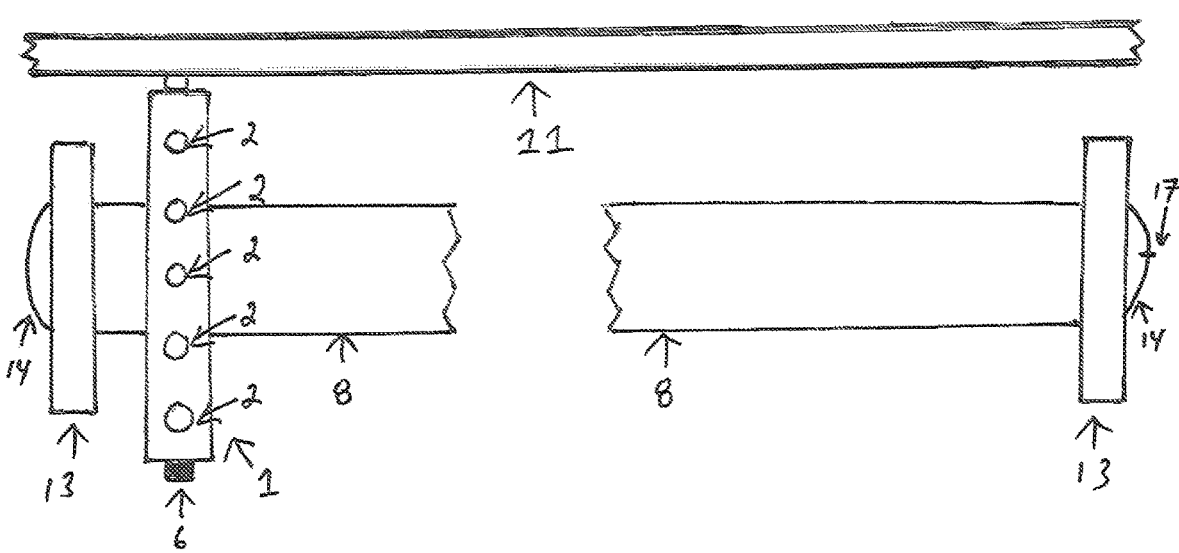
FIG. 5 shows a side view of the heating apparatus with an anti-ignition re-useable bladder installed inside. The heating apparatus has been installed over a pipe with flanges on each end. The heating apparatus is attached to a trolley and is pushed over the metal work piece it is heating. The speed of movement is variable. An equal or near equal space exists between the inside diameter of the heating apparatus and the outside diameter of the pipe.

FIG. 5 shows a side view of the heating apparatus 1 with an anti-ignition re-useable bladder 14 installed inside. The heating apparatus 1 has been installed over a pipe 8 with flanges 13 on each end. The heating apparatus 1 is attached to a trolley 11 and is pushed over the pipe 8 it is heating. The speed of movement is variable. An equal or near equal space exists between the inside diameter of the heating apparatus 1 and the outside diameter of the pipe 8.

Figure 6:
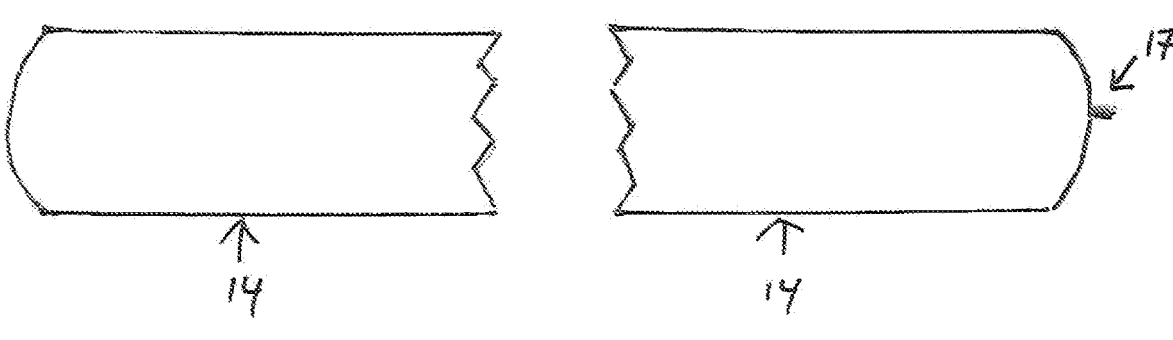
FIG. 6 shows a partially inflated anti-ignition re-useable bladder with a fitting attached for the purpose of inflating and deflating the anti-ignition re-useable bladder.

FIG. 6 shows a partially inflated anti-ignition re-useable bladder 14 with a fitting 17 attached for the purpose of inflating and deflating the anti-ignition re-useable bladder 14.

Figure 6A:
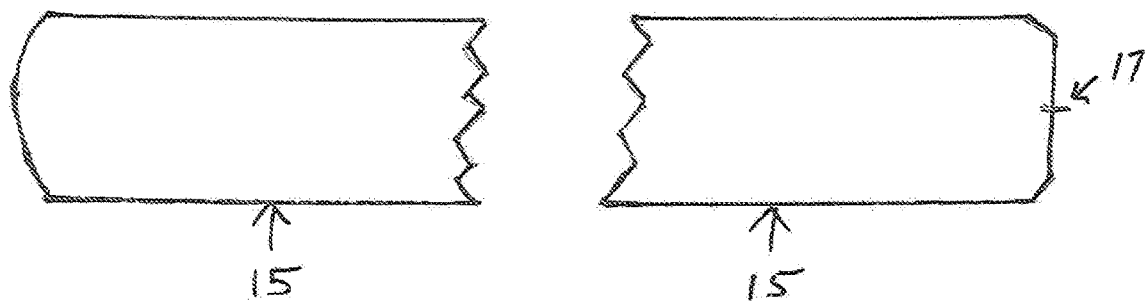
FIG. 6A shows a partially inflated anti-ignition re-useable bladder with a substantially flat end. The substantially flat end of the anti-ignition re-useable bladder is fitted with a fitting for the purpose of inflating and deflating the anti-ignition re-useable bladder.

FIG. 6A shows a partially inflated anti-ignition re-useable bladder 15 with a substantially flat end. The substantially flat end of the anti-ignition re-useable bladder 15 is fitted with a fitting 17 for the purpose of inflating and deflating the anti-ignition re-useable bladder 15.

Figure 7:
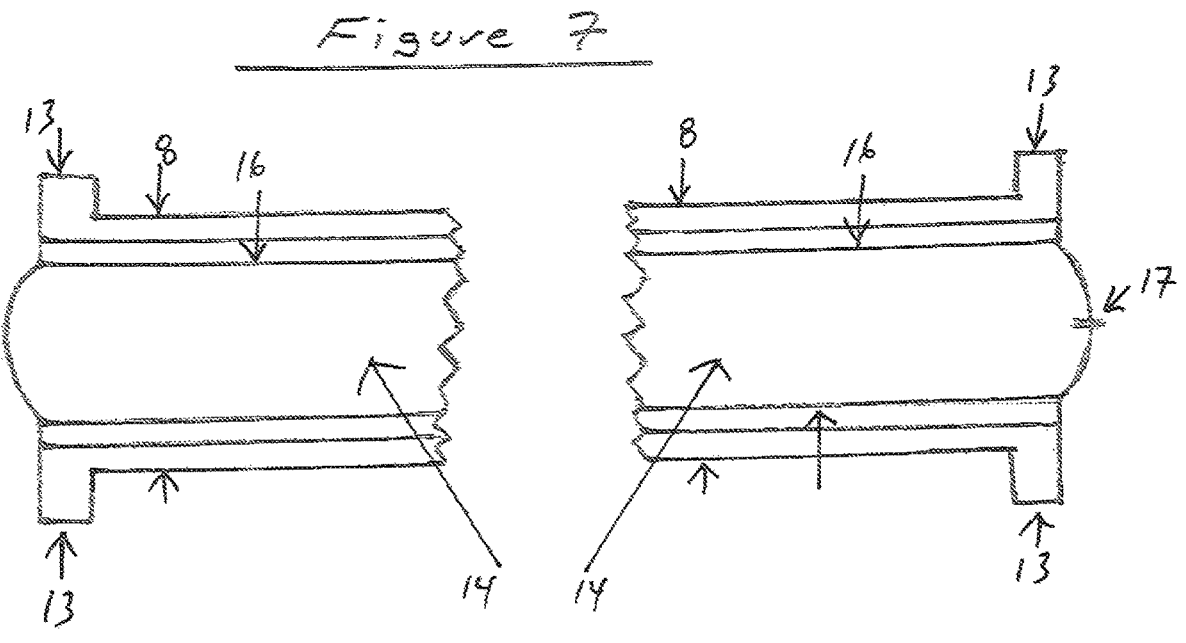
FIG. 7 shows a side cut-away view of a pipe with flanges on both ends that is lined and/or coated. An anti-ignition re-useable bladder is fitted inside of the pipe and inflated with the fitting which is fitted to the anti-ignition re-useable bladder. The anti-ignition re-useable bladder is firmly pressed against the surface of the liner or coating and occupies all the space inside the lined and/or coated pipe.

FIG. 7 shows a side cut-away view of a pipe 8 with flanges 13 on both ends that is lined and/or coated 16. An anti-ignition re-useable bladder 14 is fitted inside of the pipe 8 and inflated with the fitting 17 which is fitted to the anti-ignition re-useable bladder 14. The anti-ignition re-useable bladder 14 is firmly pressed against the surface of the liner or coating 16 and occupies all the space inside the lined and/or coated pipe 8.

Figure 7A:
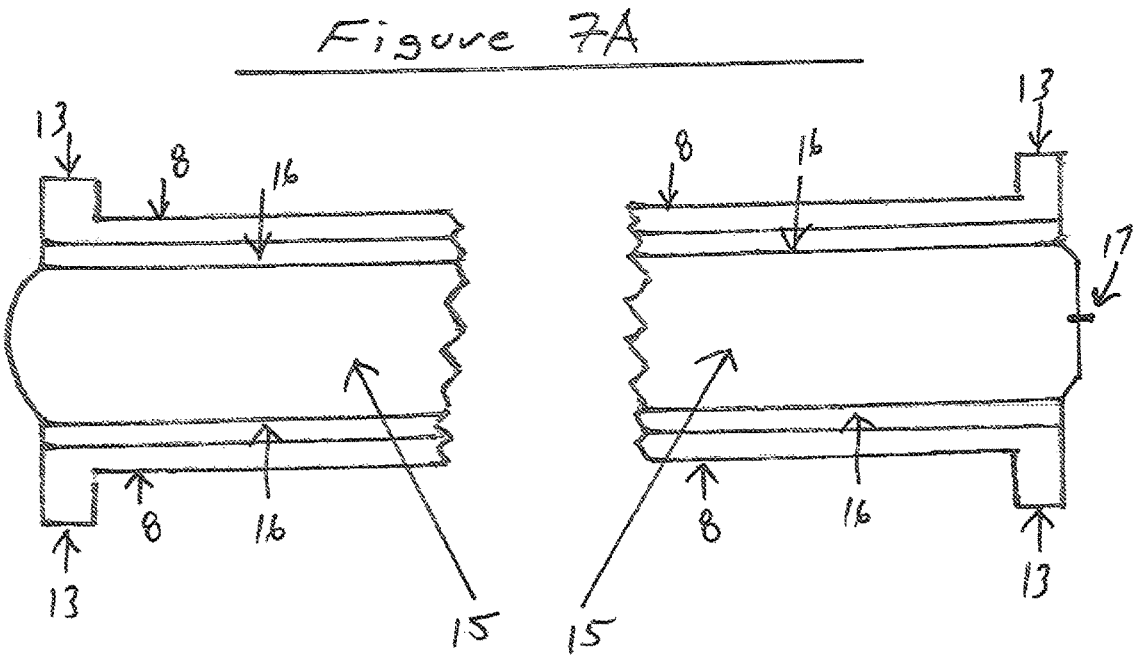
FIG. 7A shows a side cut-away view of a pipe with flanges on both ends that is lined and/or coated. An anti-ignition re-useable bladder with an end which is substantially flat is fitted inside of the pipe and inflated with the fitting which is fitted to the substantially flat end on the anti-ignition re-useable bladder. The anti-ignition re-useable bladder with a substantially flat end is firmly pressed against the surface of the liner or coating and occupies all the space inside the lined and/or coated pipe.

FIG. 7A shows a side cut-away view of a pipe 8 with flanges 13 on both ends that is lined and/or coated 16. An anti-ignition re-useable bladder 15 with an end which is substantially flat is fitted inside of the pipe 8 and inflated with the fitting 17 which is fitted to the substantially flat end on the anti-ignition re-useable bladder 15. The anti-ignition re-useable bladder 15 with a substantially flat end is firmly pressed against the surface of the liner or coating 16 and occupies all the space inside the lined and/or coated pipe 8.

The invention claimed is:

1. A heating apparatus for recycling metal work pieces such as pipes, stacks, tanks and chutes which are lined or coated with materials such as rubber, neoprene, polyurethane plastic or any non-metallic material on the inner surface(s), the heating apparatus surrounds the metal work piece, a space separates an inside surface of the heating apparatus and an outside surface of the metal work piece so as to clear the metal work piece and any obstacles on the metal work piece, wherein as the heating apparatus moves longitudinally over the metal work piece, the heating apparatus heats the metal work piece to the point where an adhesive bond between the metal work piece and the rubber, neoprene, polyurethane, plastic or non-metallic material is broken, the heating apparatus supplying a controlled, uniform and adjustable heat source to the outside surface of the metal work piece, the heating apparatus comprising:

a minimum of two sections connected together with a minimum of one hinge and a minimum of one connector, shrouded burners, wheels or rollers, a minimum of one lifting lug, a minimum of one sensor, and a minimum of one winching device.

2. The heating apparatus according to claim 1, wherein the heating apparatus comprises a minimum of two sections which are connected with a minimum of one hinge and a minimum of one connector allowing the heating apparatus to be opened and closed for easy installation and removal.

3. The heating apparatus according to claim 1, wherein the heating apparatus sections can be round, square or rectangular in shape.

4. The heating apparatus according to claim 1, wherein the heating apparatus is self-propelled, pulled or pushed across the metal work piece at a speed which is variable and partially or fully automated.

5. The heating apparatus according to claim 1, wherein the heating apparatus is fitted with a minimum of one counter weight.

6. The heating apparatus according to claim 1, wherein the heating apparatus is fitted with a minimum of one sensor such as temperature, speed, movement, or an emergency gas shut off sensor, or a combination thereof.

7. The heating apparatus according to claim 1, wherein the wheels or rollers are adjustable up and down.

8. A system for recycling metal work pieces comprising the heating apparatus of claim 1 and an anti-ignition re-usable bladder, comprising:

a flexible, anti-ignition, heat resistant, fire resistant and non-absorbent material which is fitted with a minimum of one fitting.

9. The anti-ignition re-usable bladder according to claim 8, wherein a minimum of one anti-ignition re-usable bladder is fitted inside a metal workpiece which is lined or coated on the inner surface, the anti-ignition re-useable bladder is inflated inside the metal work piece and ultimately takes on the inner shape of the metal work piece, the outside surface of the anti-ignition re-useable bladder is firmly pressed against the surface of the liner or coating, and capable of expanding and taking on the shape of the internal metal work piece and capable of holding and maintaining a pressurized gas and being any length, dimension or shape, the anti-ignition re-usable bladder prevents ignition of the liner and/or coating and eliminates or significantly reduces the release of gases and smoke from the liner and/or coating when exposed to heat.

10. A system for recycling metal work pieces comprising the heating apparatus of claim 1 and an anti-ignition re-usable bladder, comprising:

a flexible, anti-ignition, heat resistant, fire resistant and non-absorbent material which is fitted with a minimum of one fitting and having one side, top or bottom which is significantly flat.

11. The anti-ignition re-usable bladder according to claim 10, wherein a minimum of one anti-ignition re-usable bladder is fitted inside a metal workpiece which is lined or coated on the inner surface, the anti-ignition re-useable bladder is inflated inside the metal work piece and ultimately takes on the inner shape of the metal work piece, the outside surface of the anti-ignition re-useable bladder is firmly pressed against the surface of the liner or coating, and capable of expanding and taking on the shape of the internal metal work piece and capable of holding and maintaining a pressurized gas and being any length, dimension or shape, the anti-ignition re-usable bladder prevents ignition of the liner and/or coating and eliminates or significantly reduces the release of gases and smoke from the liner and/or coating when exposed to heat.

* * * * *